US010862697B2

(12) United States Patent
Mishra et al.

(10) Patent No.: US 10,862,697 B2
(45) Date of Patent: Dec. 8, 2020

(54) MULTICAST SOURCE DISCOVERY MECHANISM TO AVOID MULTICAST-TRAFFIC SYNC BETWEEN ACTIVE MULTI-HOMING PEERS OR ANY CAST GATEWAY L2 STRETCH

(71) Applicant: Cisco Technology, Inc., San Jose, CA (US)

(72) Inventors: Mankamana Prasad Mishra, Dublin, CA (US); Ali Sajassi, San Ramon, CA (US); Samir Thoria, Saratoga, CA (US); Ijsbrand Wijnands, Leuven (BE); Lester C Ginsberg, Mount Hermon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/293,447

(22) Filed: Mar. 5, 2019

(65) Prior Publication Data

US 2020/0287737 A1 Sep. 10, 2020

(51) Int. Cl.
| | | |
|---|---|---|
| *H04L 12/18* | (2006.01) | |
| *H04L 12/46* | (2006.01) | |
| *H04L 12/751* | (2013.01) | |
| *H04L 12/721* | (2013.01) | |
| *H04L 12/801* | (2013.01) | |

(52) U.S. Cl.
CPC ...... *H04L 12/1886* (2013.01); *H04L 12/4675* (2013.01); *H04L 45/02* (2013.01); *H04L 45/32* (2013.01); *H04L 45/66* (2013.01); *H04L 47/15* (2013.01)

(58) Field of Classification Search
CPC .................................................. H04L 12/1886
See application file for complete search history.

(56) References Cited

U.S. PATENT DOCUMENTS

| | | | |
|---|---|---|---|
| 9,843,513 B2 * | 12/2017 | Nagarajan | H04L 45/026 |
| 2016/0277199 A1 * | 9/2016 | Nagarajan | H04L 12/1863 |
| 2017/0289217 A1 * | 10/2017 | Kebler | H04L 45/16 |
| 2018/0367451 A1 * | 12/2018 | Gulrajani | H04L 45/54 |
| 2019/0132241 A1 * | 5/2019 | Vattem | H04L 45/245 |
| 2019/0229937 A1 * | 7/2019 | Nagarajan | H04L 12/18 |

* cited by examiner

*Primary Examiner* — Jason E Mattis
(74) *Attorney, Agent, or Firm* — Polsinelli PC

(57) ABSTRACT

Systems, methods, and computer-readable media for controlling multicast traffic flows through provider edge routers. In some examples, a multicast traffic of one or more multicast traffic flows is received from a multicast source at a first provider edge router of a plurality of provider edge routers. A multicast routing message including a loopback address of the first provider edge router can be originated at the first provider edge router. The multicast routing message can be flooded into a multicast core network for controlling traffic in the one or more multicast flows through the multicast core network to the first provider edge router. Subsequently, multicast joins can be received at the first provider edge router for establishing the one or more multicast flows through the multicast core network based on the multicast routing message including the loopback address of the first provider edge router.

20 Claims, 9 Drawing Sheets

MULTICAST SOURCE DISCOVERY MECHANISM TO AVOID MULTICAST-TRAFFIC SYNC BETWEEN ACTIVE MULTI-HOMING PEERS OR ANY CAST GATEWAY L2 STRETCH

TECHNICAL FIELD

The present technology pertains to controlling multicast traffic flows through provider edge routers, and in particular to flooding multicast routing messages including loopback addresses of the provider edge routers into a multicast core network for establishing multicast flows to the provider edge routers.

BACKGROUND

Ethernet virtual private network (EVPN) is widely used in network deployments. In particular, EVPN based all-active multi-homing is becoming a basic building block of next generation network deployments. Specifically, EVPN all-active multi-homing is being used in data center deployments as well as service provider access/aggregation networks.

In many deployments, e.g. EVPN deployments, multicast sources are protected behind all-active multi-homing segments. Specifically, multicast sources are typically connected to a plurality of provider edge routers that form a redundancy group as part of active multi-homing segments. However, since a multicast source's flow hashing algorithm is unknown, in an all-active redundancy mode it is assumed that the multicast source can send a given multicast flow to any one of the provider edge routers in a redundancy group. This is problematic, as network devices, e.g. last hop routers, are unaware of which provider edge router actually received the multicast traffic. In turn, the network devices can potentially communicate with a provider edge router that does not have the multicast traffic, thereby leading to traffic loss in multicast flows for the multicast traffic.

In order to combat this problem of potential traffic loss in multicast flows with provider edge routers in all-active multi-homing segments, the provider edge routers are typically synchronized, e.g. across redundancy groups. Specifically, when a provider edge router receives multicast traffic from a multicast source, the provider edge router can distribute the multicast traffic to other provider edge routers in the redundancy group. This can ensure that network devices communicate with a provider edge router that actually has the multicast traffic when forming and maintaining multicast traffic flows. However, bridging multicast traffic across provider edge routers in a redundancy group is an inefficient use of computational resources, in particular, as redundancy groups grow in size. There therefore exist needs of systems and methods for controlling multicast traffic flows through provider edge routers without bridging multicast traffic across provider edge routers in a redundancy group.

Further, in typical deployments multicast sources are connected to a plurality of provider edge routers through network stretching. Specifically, layer 2 stretching can be used to interconnect different network environments and data centers/data center portions over layer 3 connections, e.g. layer 3 virtual private network overlays. More specifically, integrated routing and bridging (IRB) can be used to communicate across layer 3 overlays to accomplish layer 2 stretching across different network environments and data centers.

However, layer 2 stretching can create a similar problem as described previously with respect to multicast traffic flows in all-active multi-homing segments of network deployments, e.g. EVPN deployments. Specifically, provider edge routers connected through layer 2 stretches can have the same IRB IP address for purposes of communicating with the provider edge routers. Therefore, when multicast traffic arrives at a provider edge router for forming a multicast traffic flow, a network device, e.g. last hop router, may attempt to communicate with a different provider edge router coupled to the provider edge router through a layer 2 stretch. Specifically, a network device may attempt to communicate with a provider edge router that does not actually have multicast traffic based on the provider edge router having the same IRP IP address as a provider edge router that actually has the multicast traffic. In turn, this can lead to traffic dropping and an inability to correctly form multicast traffic flows.

In order to combat this problem of potential traffic loss in multicast flows with provider edge routers connected through layer 2 stretching, the provider edge routers are typically synchronized. Specifically, when a provider edge router receives multicast traffic from a multicast source, the provider edge router can distribute the multicast traffic to other provider edge routers coupled to the provider edge router through layer 2 stretching. This can ensure that network devices communicate with a provider edge router that actually has the multicast traffic when forming and maintaining multicast traffic flows. However, flooding multicast traffic across layer 2 stretches is an inefficient use of computational resources, in particular, as the number of layer 2 stretches in network environments increases. There therefore exist needs of systems and methods for controlling multicast traffic flows through provider edge routers without flooding multicast traffic across layer 2 stretches.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
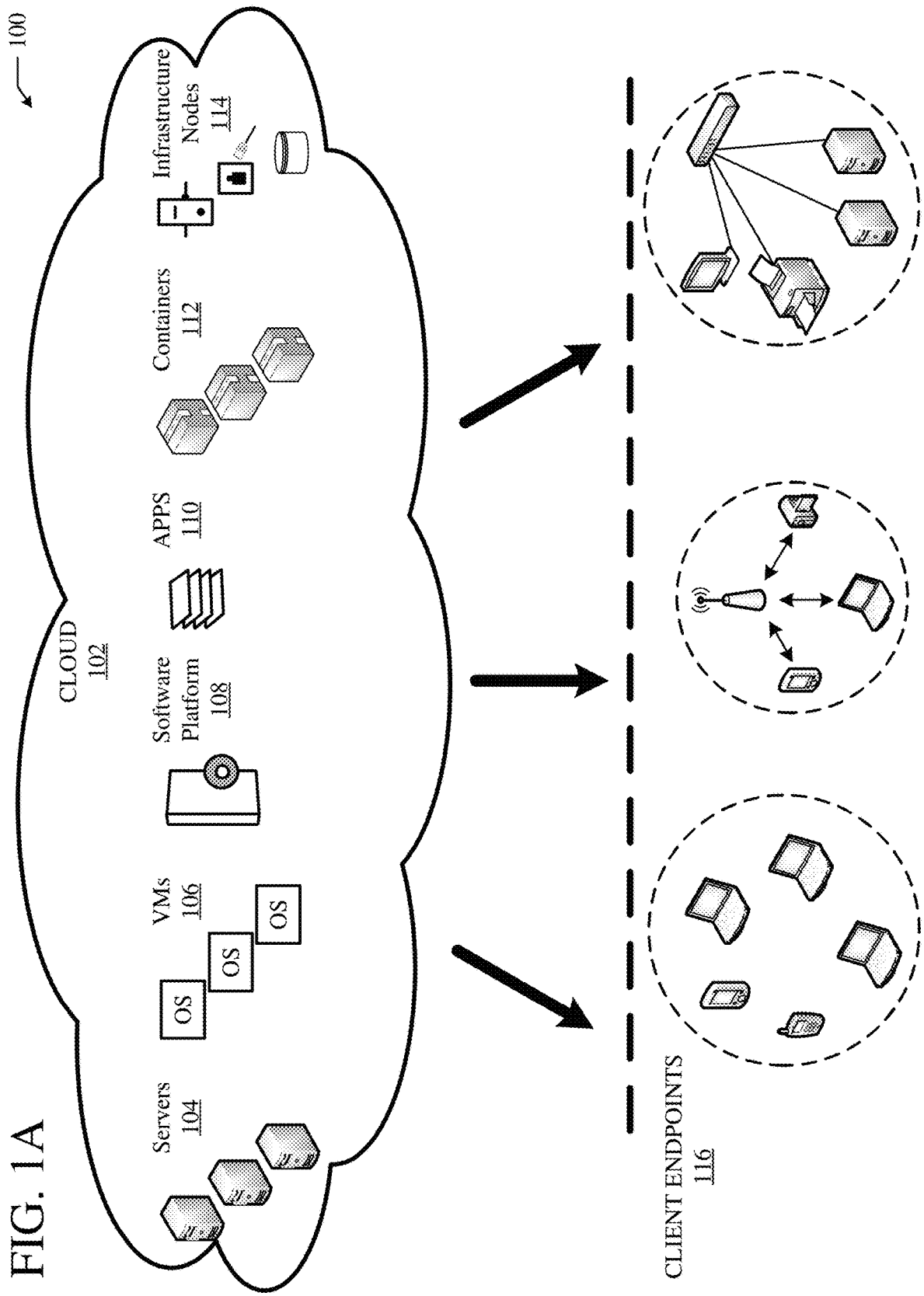
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include receiving, at a first provider edge router of a plurality of provider edge routers, multicast traffic of one or more multicast flows from a multicast source. Further, a multicast routing message can be originated at the first provider edge router. The multicast routing message can include a multicast source indicator of the multicast source, a multicast group identifier of the multicast traffic, and a loopback address of the first provider edge router. As follows, the multicast routing message can be flooded, from the first provider edge router, into a multicast core network for controlling traffic in the one or more multicast traffic flows through the multicast core network to the first provider edge router. One or more multicast joins can be received at the first provider edge router from the multicast core network for establishing the one or more multicast flows through the multicast core network to the first provider edge router based on the multicast routing message. Specifically, the one or more multicast joins can be received at the first provider edge router based on the loopback address of the first provider edge router included in the multicast routing message.

A system can include one or more processors and at least one computer-readable storage medium storing instructions which, when executed by the one or more processors, cause the one or more processors to receive, at a first provider edge router of a plurality of provider edge routers, multicast traffic of one or more multicast flows from a multicast source. The instructions can also cause the one or more processors to originate, at the first provider edge router, a multicast routing message. The multicast routing message can include a multicast source indicator of the multicast source, a multicast group identifier of the multicast traffic, and a loopback address of the first provider edge router included as a type-length value (TLV) in the multicast routing message. Further, the instructions can cause the one or more processors to flood the multicast routing message, from the first provider edge router, into a multicast core network for controlling traffic in the one or more multicast traffic flows through the multicast core network to the first provider edge router. As follows, the instructions can cause the one or more processors to receive one or more multicast joins at the first provider edge router from the multicast core network for establishing the one or more multicast flows through the multicast core network to the first provider edge router based on the multicast routing message. Specifically, the one or more multicast joins can be received at the first provider edge router based on the loopback address of the first provider edge router include in the multicast routing message.

A non-transitory computer-readable storage medium having stored therein instructions which, when executed by a processor, cause the processor to receive, at a first provider edge router of a plurality of provider edge routers, multicast traffic of one or more multicast flows from a multicast source. The instructions can cause the processor to originate, at the first provider edge router, a multicast routing message. The multicast routing message can include a multicast source indicator of the multicast source, a multicast group identifier of the multicast traffic, and a loopback address of the first provider edge router. Further, the instructions can cause the processor to flood the multicast routing message, through a PIM flooding mechanism and source discovery (PFM-SD) message, into a multicast core network from the first provider edge router. The multicast routing message can be used for controlling traffic in the one or more multicast flows through the multicast core network to the first provider edge router.

Example Embodiments

The disclosed technology addresses the need in the art for controlling multicast traffic flows through provider edge routers and in particular to controlling multicast traffic flows through provider edge routers while refraining from dispersing multicast traffic across a plurality of the provider edge routers. The present technology involves system, methods, and computer-readable media for controlling multicast traffic flows through provider edge routers using loopback addresses of the provider edge routers.

Figure 3:
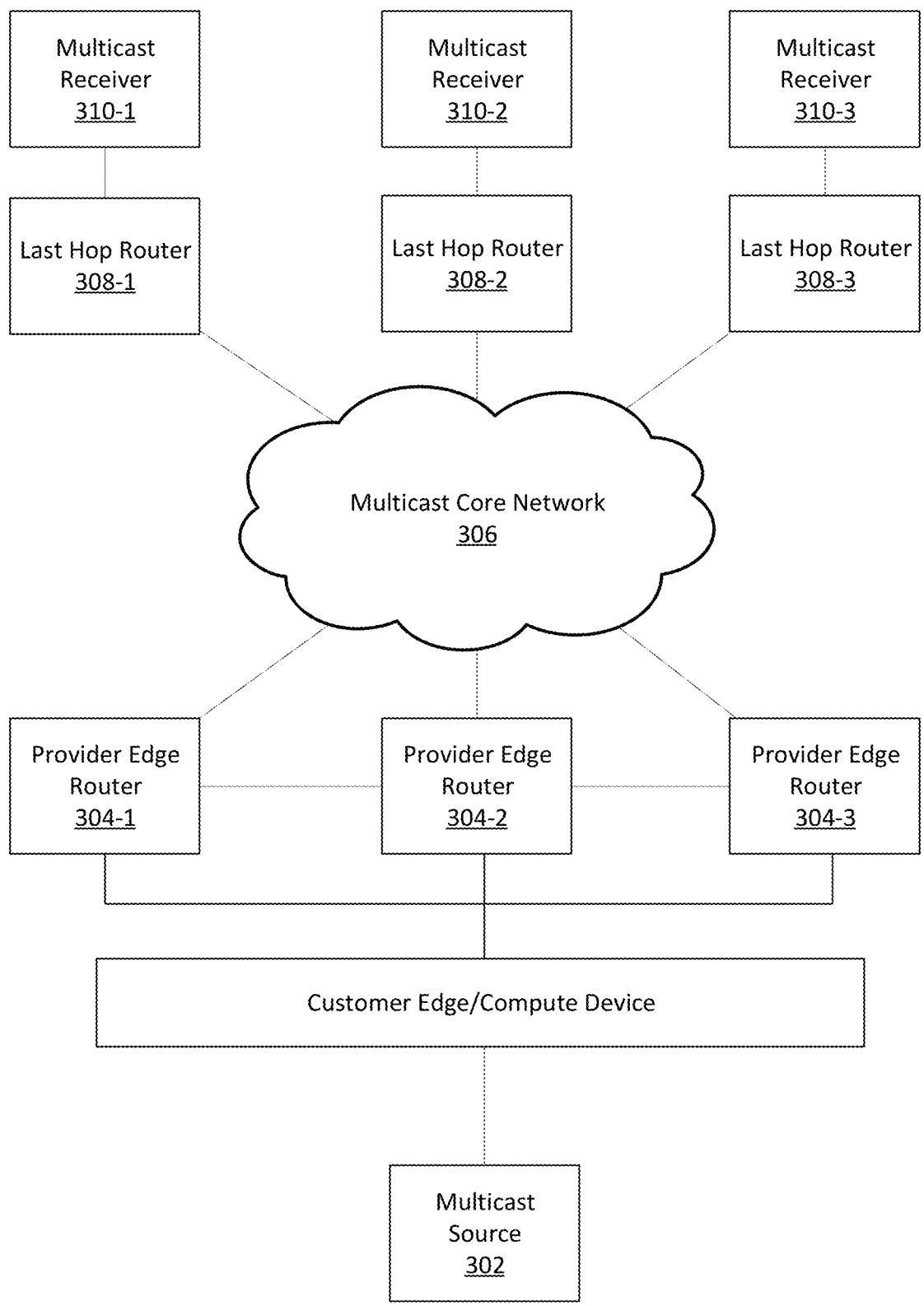
FIG. 3 illustrates an example multicast environment with all-active multi-homing segments used in controlling multicast flows.
Figure 4:
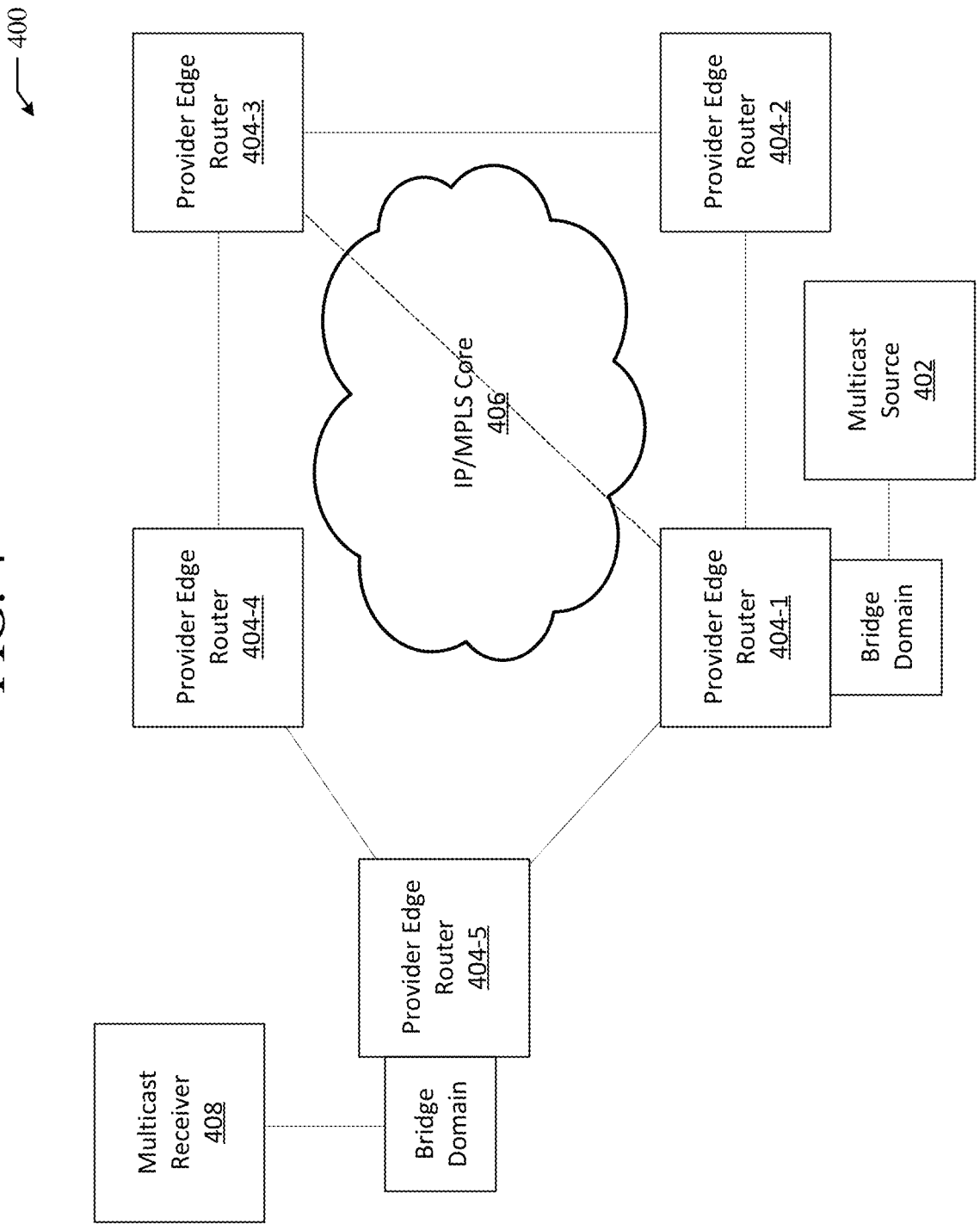
FIG. 4 illustrates an example multicast environment with layer 2 stretching.
Figure 5:
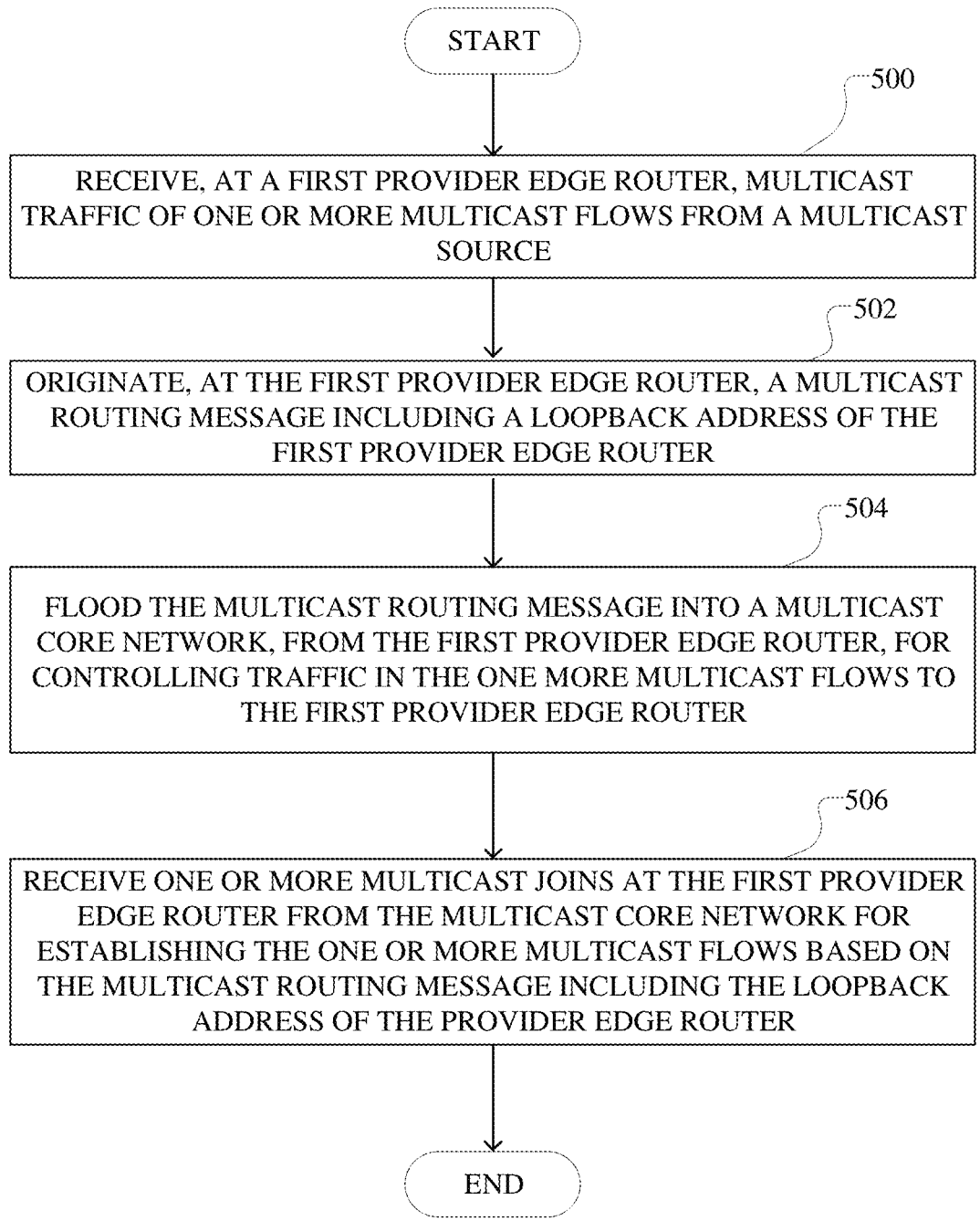
FIG. 5 illustrates a flowchart for an example method for controlling multicast traffic flows through provider edge routers using loopback addresses of the provider edge routers.
Figure 6:
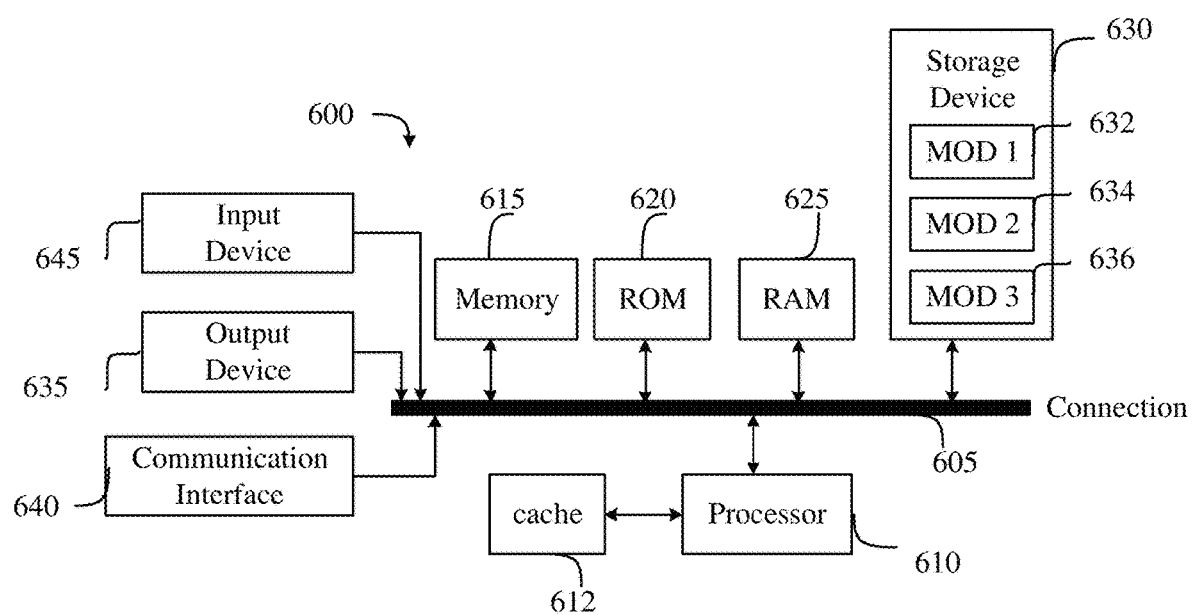
FIG. 6 illustrates an example computing system.
Figure 7:
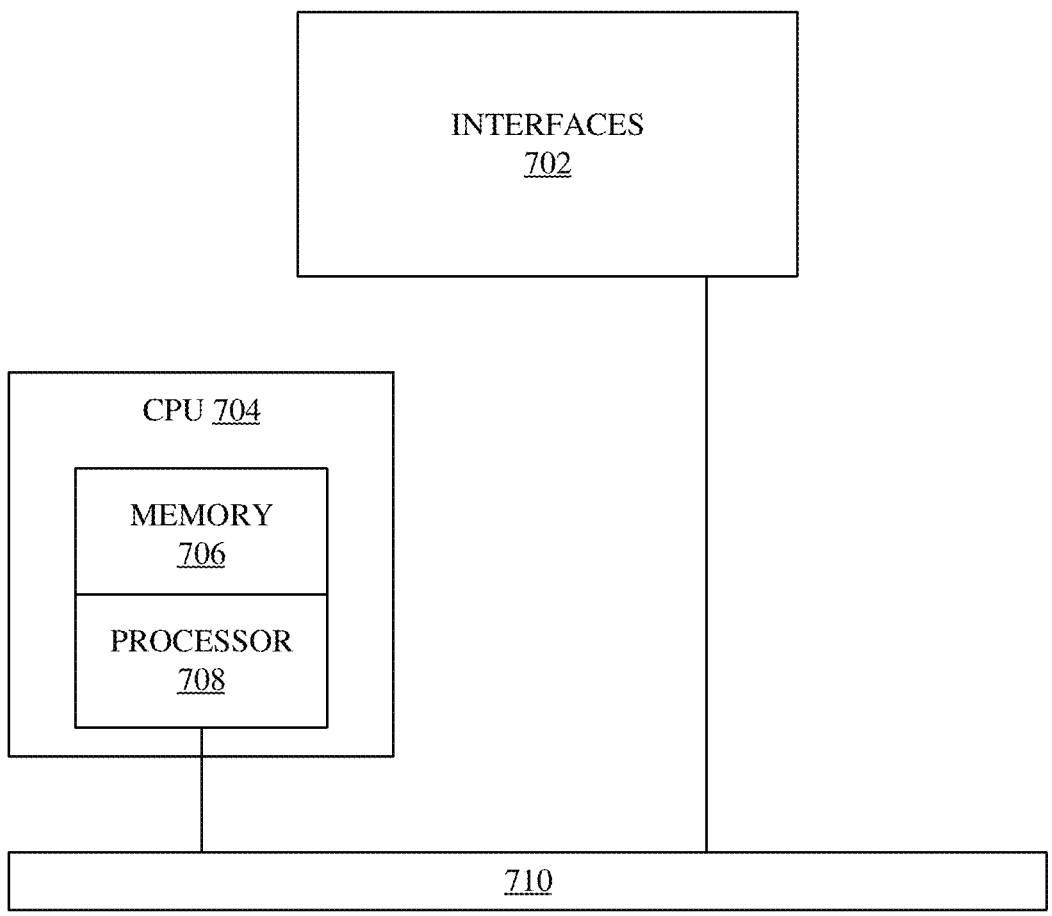
FIG. 7 illustrates an example network device.

A description of network environments and architectures for network data access and services, as illustrated in FIGS. 1A, 1B, 2A, 2B is first disclosed herein. A discussion of systems, methods, and computer-readable medium for controlling multicast traffic flows through provider edge routers using loopback address of the provider edge routers, as shown in FIGS. 3-5, will then follow. The discussion then concludes with a brief description of example devices, as illustrated in FIGS. 6 and 7. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1B:
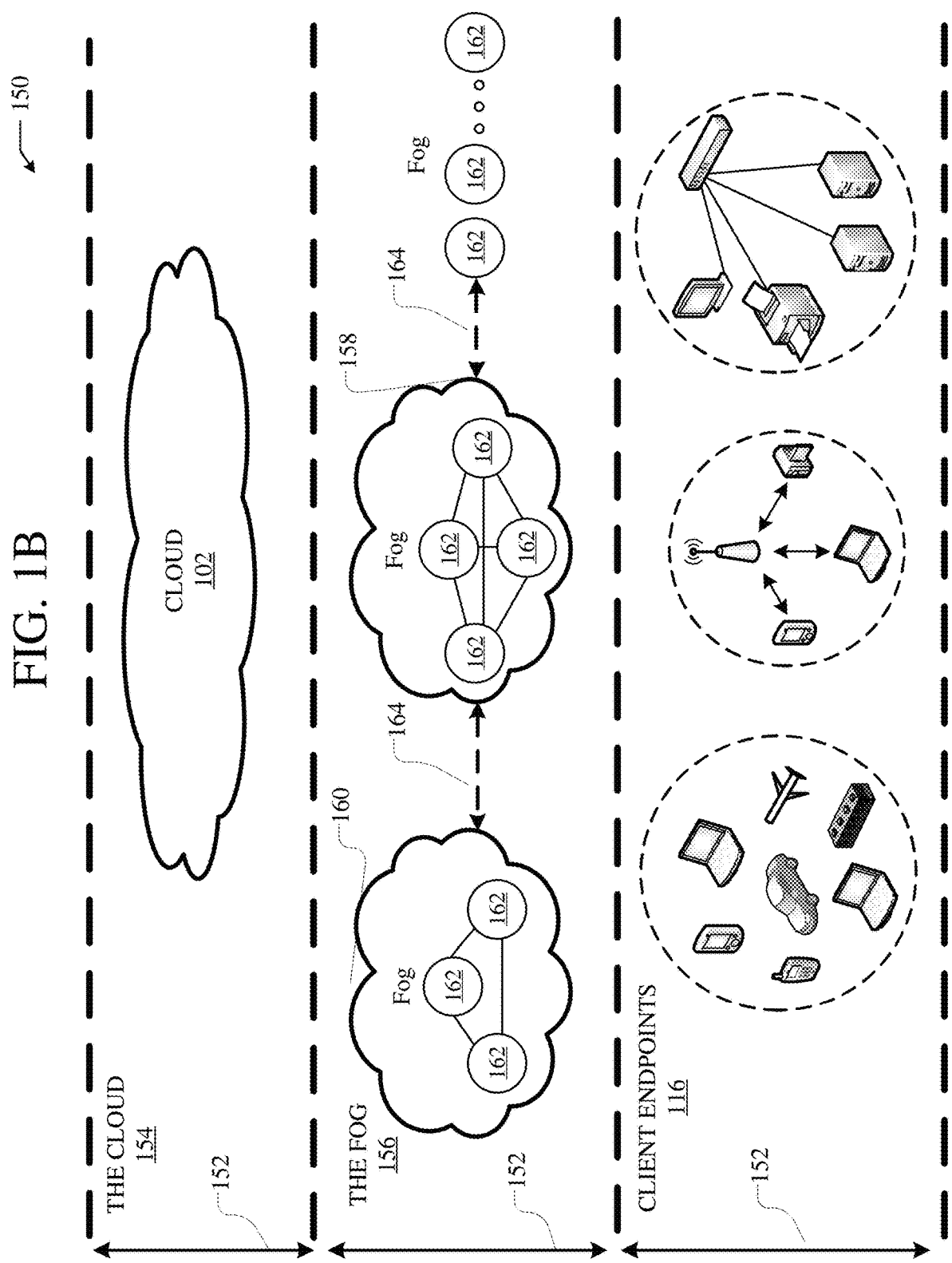
FIG. 1B illustrates an example fog computing architecture.

FIG. 1B illustrates a diagram of an example fog computing architecture 150. The fog computing architecture can be used to form part of a TCP connection or otherwise be accessed through the TCP connection. Specifically, the fog computing architecture can include an initiator or a receiver of a TCP connection and be utilized by the initiator or the receiver to transmit and/or receive data through the TCP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2A:
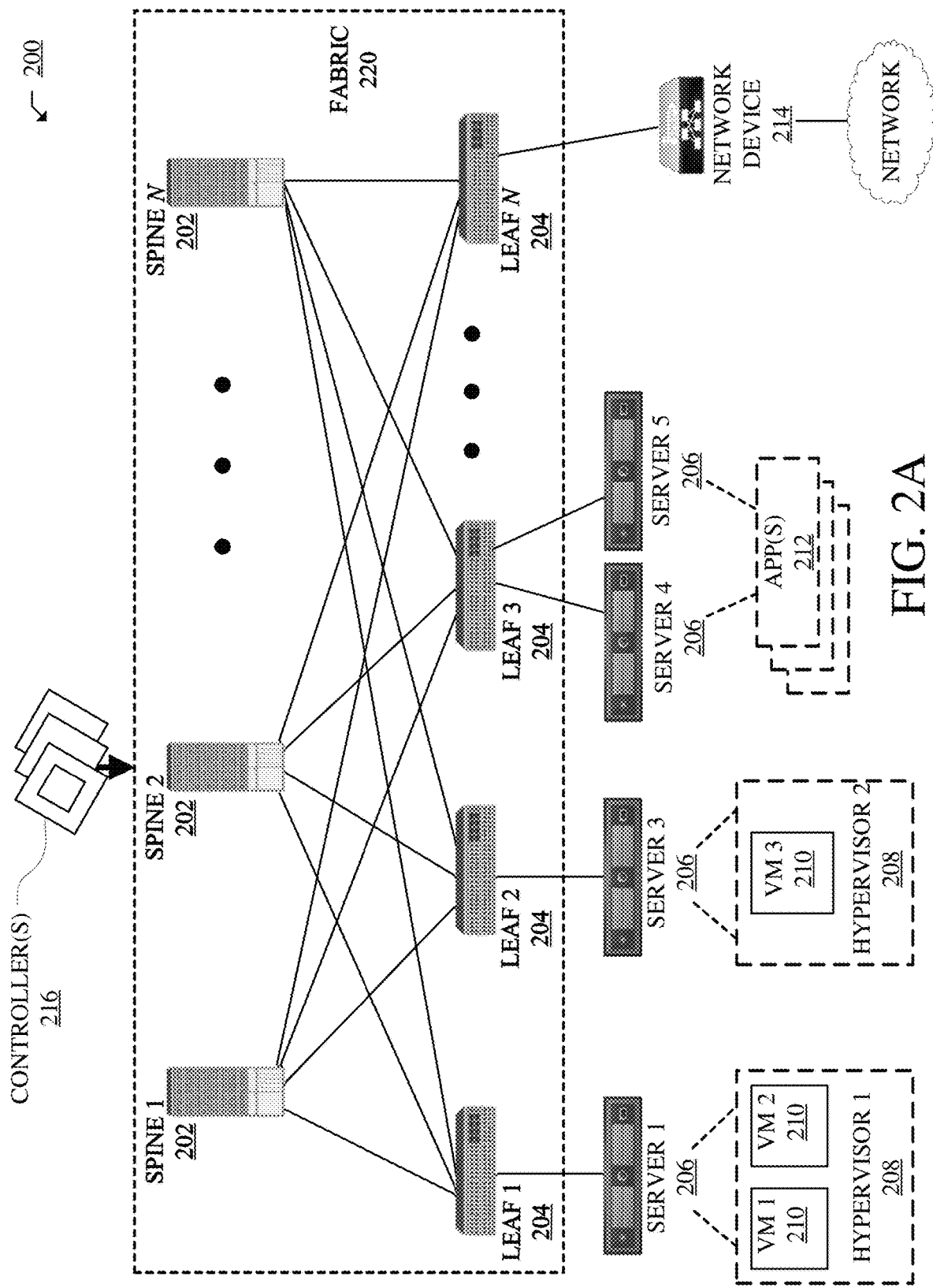
FIG. 2A illustrates a diagram of an example network environment, such as a data center.

FIG. 2A illustrates a diagram of an example Network Environment 200, such as a data center. In some cases, the Network Environment 200 can include a data center, which can support and/or host the cloud 102. The Network Environment 200 can include a Fabric 220 which can represent the physical layer or infrastructure (e.g., underlay) of the Network Environment 200. Fabric 220 can include Spines 202 (e.g., spine routers or switches) and Leafs 204 (e.g., leaf routers or switches) which can be interconnected for routing or switching traffic in the Fabric 220. Spines 202 can interconnect Leafs 204 in the Fabric 220, and Leafs 204 can connect the Fabric 220 to an overlay or logical portion of the Network Environment 200, which can include application services, servers, virtual machines, containers, endpoints, etc. Thus, network connectivity in the Fabric 220 can flow from Spines 202 to Leafs 204, and vice versa. The interconnections between Leafs 204 and Spines 202 can be redundant (e.g., multiple interconnections) to avoid a failure in routing. In some embodiments, Leafs 204 and Spines 202 can be fully connected, such that any given Leaf is connected to each of the Spines 202, and any given Spine is connected to each of the Leafs 204. Leafs 204 can be, for example, top-of-rack ("ToR") switches, aggregation switches, gateways, ingress and/or egress switches, provider edge devices, and/or any other type of routing or switching device.

Leafs 204 can be responsible for routing and/or bridging tenant or customer packets and applying network policies or rules. Network policies and rules can be driven by one or more Controllers 216, and/or implemented or enforced by one or more devices, such as Leafs 204. Leafs 204 can connect other elements to the Fabric 220. For example, Leafs 204 can connect Servers 206, Hypervisors 208, Virtual Machines (VMs) 210, Applications 212, Network Device 214, etc., with Fabric 220. Such elements can reside in one or more logical or virtual layers or networks, such as an overlay network. In some cases, Leafs 204 can encapsulate and decapsulate packets to and from such elements (e.g., Servers 206) in order to enable communications throughout Network Environment 200 and Fabric 220. Leafs 204 can also provide any other devices, services, tenants, or workloads with access to Fabric 220. In some cases, Servers 206 connected to Leafs 204 can similarly encapsulate and decapsulate packets to and from Leafs 204. For example, Servers 206 can include one or more virtual switches or routers or tunnel endpoints for tunneling packets between an overlay or logical layer hosted by, or connected to, Servers 206 and an underlay layer represented by Fabric 220 and accessed via Leafs 204.

Applications 212 can include software applications, services, containers, appliances, functions, service chains, etc. For example, Applications 212 can include a firewall, a database, a CDN server, an IDS/IPS, a deep packet inspection service, a message router, a virtual switch, etc. An application from Applications 212 can be distributed, chained, or hosted by multiple endpoints (e.g., Servers 206, VMs 210, etc.), or may run or execute entirely from a single endpoint.

VMs 210 can be virtual machines hosted by Hypervisors 208 or virtual machine managers running on Servers 206. VMs 210 can include workloads running on a guest operating system on a respective server. Hypervisors 208 can provide a layer of software, firmware, and/or hardware that creates, manages, and/or runs the VMs 210. Hypervisors 208 can allow VMs 210 to share hardware resources on Servers 206, and the hardware resources on Servers 206 to appear as multiple, separate hardware platforms. Moreover, Hypervisors 208 on Servers 206 can host one or more VMs 210.

In some cases, VMs 210 and/or Hypervisors 208 can be migrated to other Servers 206. Servers 206 can similarly be migrated to other locations in Network Environment 200. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 206, Hypervisors 208, and/or VMs 210 can represent or reside in a tenant or customer space. Tenant space can include workloads, services, applications, devices, networks, and/or resources that are associated with one or more clients or subscribers. Accordingly, traffic in Network Environment 200 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 216, Servers 206, Leafs 204, etc.

Configurations in Network Environment 200 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 216, which can implement or propagate such configurations through Network Environment 200. In some examples, Controllers 216 can be Application Policy Infrastructure Controllers (APICs) in an ACI framework. In other examples, Controllers 216 can be one or more management components for associated with other SDN solutions, such as NSX Managers.

Such configurations can define rules, policies, priorities, protocols, attributes, objects, etc., for routing and/or classifying traffic in Network Environment 200. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 200, such as Leafs 204, Servers 206, Hypervisors 208, Controllers 216, etc. As previously explained, Network Environment 200 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 200. Endpoints can have one or more attributes such as a VM name, guest OS name, a security tag, application profile, etc. Application configurations can be applied between EPGs, instead of endpoints directly, in the form of contracts. Leafs 204 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 204 can tie packets with their attribute EPGs based on their identifiers and enforce policies, which can be implemented and/or managed by one or more Controllers 216. Leaf 204 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 2A, Network Environment 200 can deploy different hosts via Leafs 204, Servers 206, Hypervisors 208, VMs 210, Applications 212, and Controllers 216, such as VMWARE ESXi hosts, WINDOWS HYPER-V hosts, bare metal physical hosts, etc. Network Environment 200 may interoperate with a variety of Hypervisors 208, Servers 206 (e.g., physical and/or virtual servers), SDN orchestration platforms, etc. Network Environment 200 may implement a declarative model to allow its integration with application design and holistic network policy.

Controllers 216 can provide centralized access to fabric information, application configuration, resource configuration, application-level configuration modeling for a software-defined network (SDN) infrastructure, integration with management systems or servers, etc. Controllers 216 can form a control plane that interfaces with an application plane via northbound APIs and a data plane via southbound APIs.

As previously noted, Controllers 216 can define and manage application-level model(s) for configurations in Network Environment 200. In some cases, application or device configurations can also be managed and/or defined by other components in the network. For example, a hypervisor or virtual appliance, such as a VM or container, can run a server or management tool to manage software and services in Network Environment 200, including configurations and settings for virtual appliances.

As illustrated above, Network Environment 200 can include one or more different types of SDN solutions, hosts, etc. For the sake of clarity and explanation purposes, various examples in the disclosure will be described with reference to an ACI framework, and Controllers 216 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 206 (e.g., physical or logical), Hypervisors 208, VMs 210, containers (e.g., Applications 212), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

Figure 2B:
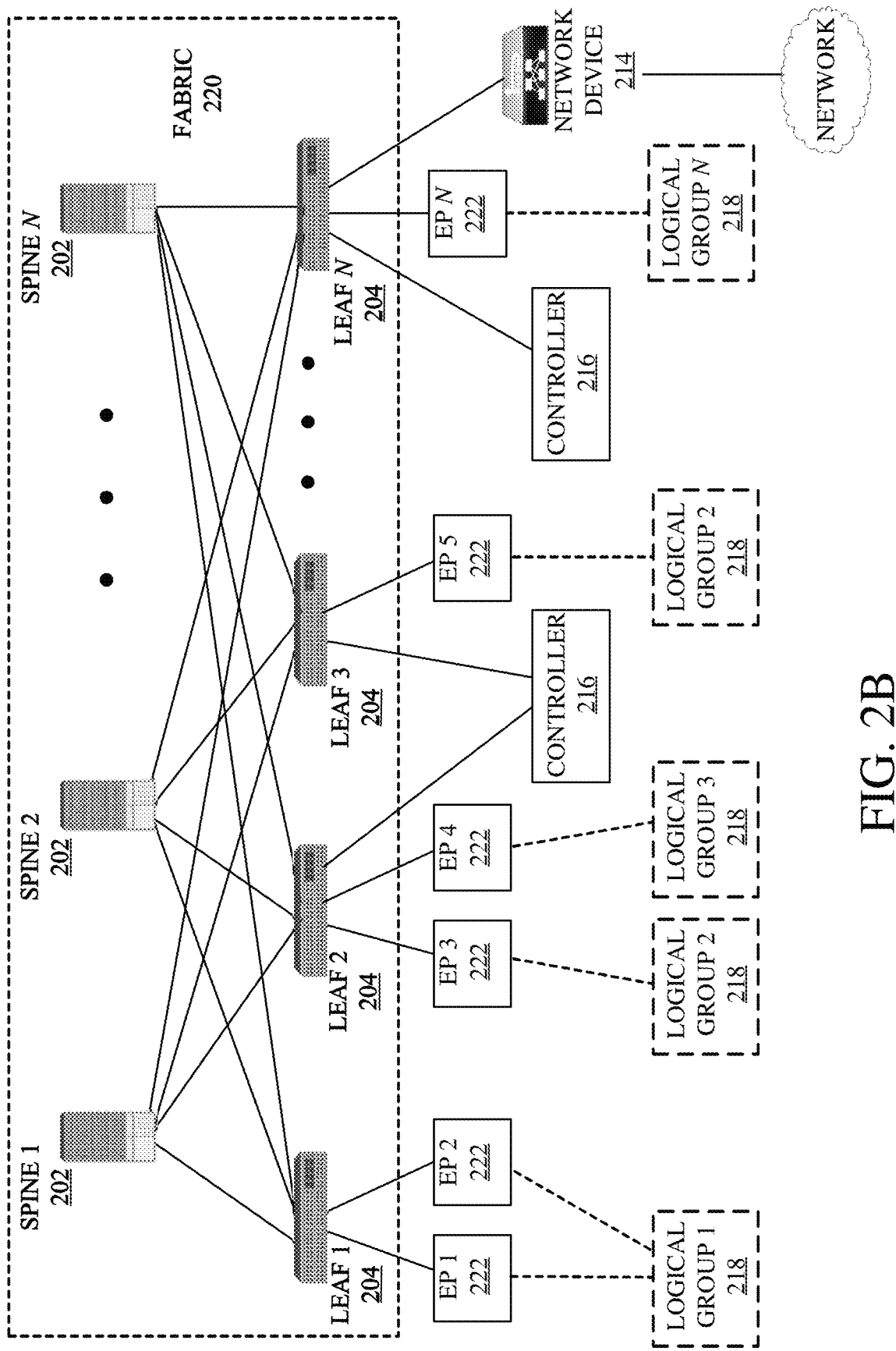
FIG. 2B illustrates another example of a network environment.

FIG. 2B illustrates another example of Network Environment 200. In this example, Network Environment 200 includes Endpoints 222 connected to Leafs 204 in Fabric 220. Endpoints 222 can be physical and/or logical or virtual entities, such as servers, clients, VMs, hypervisors, software containers, applications, resources, network devices, workloads, etc. For example, an Endpoint 222 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 222 can be associated with respective Logical Groups 218. Logical Groups 218 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 218 are EPGs in an ACI environment and/or other logical groups (e.g., SGs) in another SDN environment.

Traffic to and/or from Endpoints 222 can be classified, processed, managed, etc., based Logical Groups 218. For example, Logical Groups 218 can be used to classify traffic to or from Endpoints 222, apply policies to traffic to or from Endpoints 222, define relationships between Endpoints 222, define roles of Endpoints 222 (e.g., whether an endpoint consumes or provides a service, etc.), apply rules to traffic to or from Endpoints 222, apply filters or access control lists (ACLs) to traffic to or from Endpoints 222, define communication paths for traffic to or from Endpoints 222, enforce requirements associated with Endpoints 222, implement security and other configurations associated with Endpoints 222, etc.

In an ACI environment, Logical Groups 218 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

As discussed previously, EVPN is widely used in network deployments. In particular, EVPN based all-active multi-homing is becoming a basic building block of next generation network deployments. Specifically, EVPN all-active multi-homing is being used in data center deployments as well as service provider access/aggregation networks.

In many deployments, e.g. EVPN deployments, multicast sources are protected behind all-active multi-homing segments. Specifically, multicast sources are typically connected to a plurality of provider edge routers that form a redundancy group as part of active multi-homing segments. However, since a multicast source's flow hashing algorithm is unknown, in an all-active redundancy mode it is assumed that the multicast source can send a given multicast flow to any one of the provider edge routers in a redundancy group. This is problematic, as network devices, e.g. last hop routers, are unaware of which provider edge router actually received the multicast traffic. In turn, the network devices can potentially communicate with a provider edge router that does not have the multicast traffic, thereby leading to traffic loss in multicast flows for the multicast traffic.

In order to combat this problem of potential traffic loss in multicast flows with provider edge routers in all-active multi-homing segments, the provider edge routers are typically synchronized, e.g. across redundancy groups. Specifically, when a provider edge router receives multicast traffic from a multicast source, the provider edge router can distribute the multicast traffic to other provider edge routers in the redundancy group. This can ensure that network devices communicate with a provider edge router that actually has the multicast traffic when forming and maintaining multicast traffic flows. However, bridging multicast traffic across provider edge routers in a redundancy group is an inefficient use of computational resources, in particular, as redundancy groups grow in size. There therefore exist needs of systems and methods for controlling multicast traffic flows through provider edge routers without bridging multicast traffic across provider edge routers in a redundancy group.

Further, in typical deployments multicast sources are connected to a plurality of provider edge routers through network stretching. Specifically, layer 2 stretching can be used to interconnect different network environments and data centers/data center portions over layer 3 connections, e.g. layer 3 virtual private network overlays. More specifically, IRB can be used to communicate across layer 3 overlays to accomplish layer 2 stretching across different network environments and data centers.

However, layer 2 stretching can create a similar problem as described previously with respect to multicast traffic flows in all-active multi-homing segments of network deployments, e.g. EVPN deployments. Specifically, provider edge routers connected through layer 2 stretches can have the same IRB IP address for purposes of communicating with the provider edge routers. Therefore, when multicast traffic arrives at a provider edge router for forming a multicast traffic flow, a network device, e.g. last hop router, may attempt to communicate with a different provider edge router coupled to the provider edge router through a layer 2 stretch. Specifically, a network device may attempt to communicate with a provider edge router that does not actually have multicast traffic based on the provider edge router having the same IRP IP address as a provider edge router that actually has the multicast traffic. In turn, this can lead to traffic dropping and an inability to correctly form multicast traffic flows.

In order to combat this problem of potential traffic loss in multicast flows with provider edge routers connected through layer 2 stretching, the provider edge routers are typically synchronized. Specifically, when a provider edge router receives multicast traffic from a multicast source, the provider edge router can distribute the multicast traffic to other provider edge routers coupled to the provider edge router through layer 2 stretching. This can ensure that network devices communicate with a provider edge router that actually has the multicast traffic when forming and maintaining multicast traffic flows. However, flooding multicast traffic across layer 2 stretches is an inefficient use of computational resources, in particular, as the number of layer 2 stretches in network environments increases. There therefore exist needs of systems and methods for controlling multicast traffic flows through provider edge routers without flooding multicast traffic across layer 2 stretches.

The present includes systems, methods, and computer-readable mediums for receiving, at a first provider edge router of a plurality of provider edge routers, multicast traffic of one or more multicast flows from a multicast source. Further, a multicast routing message can be originated at the first provider edge router. The multicast routing message can include a multicast source indicator of the multicast source, a multicast group identifier of the multicast traffic, and a loopback address of the first provider edge router as a TLV included in the multicast routing message. As follows, the multicast routing message can be flooded as a PFM-SD message, from the first provider edge router, into a multicast core network for controlling traffic in the one or more multicast traffic flows through the multicast core network to the first provider edge router. One or more multicast joins can be received at the first provider edge router from the multicast core network for establishing the one or more multicast flows through the multicast core network to the first provider edge router based on the multicast routing message. Specifically, the one or more multicast joins can be received at the first provider edge router based on the loopback address of the first provider edge router included in the multicast routing message.

FIG. 3 illustrates an example multicast environment 300 with all-active multi-homing segments used in controlling multicast flows. The example environment 300 shown in FIG. 3 includes a multicast source 302, a first provider edge router 304-1, a second provider edge router 304-2, a third provider edge router 304-3, a multicast core network 306, a first last hop router 308-1, a second last hop router 308-2, a third last hop router 308-3, and multicast receivers 310-1, 310-2, and 310-3. The environment 300, shown in FIG. 3, can be implemented using one or a combination of the environments and architectures shown in FIGS. 1-2. For example, the multicast environment 300 can be implemented, at least in part, through a data center formed by the environment 200 shown in FIG. 2A. Further, the multicast environment 300 can be implemented as part of an EVPN network deployment. While the environment 300 is shown to include a specific number of devices, in various embodiments, the environment 300 can be formed by a different number of devices, e.g. provider edge routers.

In the example environment 300 shown in FIG. 3, the provider edge routers 304-1, 304-2, and 304-3 can form all-active multi-homing segments. Specifically, each of the provider edge routers 304-1, 304-2, and 304-3 can be coupled to the multicast source 302 and form part of a redundancy group. The provider edge routers 304-1, 304-2, and 304-3 can be coupled to the multicast source 302 through one or more customer edge/compute devices. In being connected to the multicast source 302, as part of all-active multi-homing segments, each of the provider edge routers 304-1, 304-2, and 304-3 can receive traffic, e.g. multicast traffic, from the multicast source 302. Similarly, each of the provider edge routers 304-1, 304-2, and 304-3 can send traffic, e.g. multicast traffic, to the multicast source 302.

In typical network deployments, the first provider edge router 304-1 can receive multicast traffic from the multicast source 302 for creating one or more multicast traffic flows through the environment 300. At least one of the multicast receivers, e.g. the first multicast receiver 310-1, can attempt to join a multicast flow associated with the multicast traffic received at the first provider edge router 304-1. Specifically, the first multicast receiver 310-1 can attempt to join the multicast flow through the first last hop router 308-1 and the multicast core network 308.

However, as the first provider edge router 304-1, the second provider edge router 304-2, and the third provider edge router 304-3 each form all-active multi-homing segments with the multicast source 302, any of the routers 304-1, 304-2, and 304-3 can receive the traffic from the multicast source 302. As discussed previously, this is problematic as the first multicast receiver 310-1 does not know which of the provider edge routers 304-1, 304-2 and 30$-3 actually has the multicast traffic for the multicast flow. Specifically, the multicast receiver 310-1 can do a multicast source prefix lookup to identify the multicast source 302 as the source of the multicast traffic while not knowing which of the provider edge routers 304-1, 304-2, and 304-3 actually received the multicast traffic from the multicast source 302. More specifically, since the multicast source's flow hashing algorithm is unknown, in an all-active redundancy/multi-homing mode, it is assumed that the multicast source can send the multicast traffic to any one of the provider edge routers 304-1, 304-2, and 304-3. Accordingly, the multicast receiver 310-1 does not know which provider edge router 304-1, 304-2, and 304-3 actually received the multicast traffic but knows that it can communicate with the multicast source through any of the provider edge routers 304-1, 304-2, and 304-3. As a result, the multicast receiver 310-1 can communicate with an edge router, e.g. the second provider edge router 304-2, that does not actually have the multicast traffic, thereby leading to potential traffic loss and multicast flow failure.

In order to negate this problem, in typical EVPN all-active multi-homing deployments, the provider edge routers 304-1, 304-2, and 304-3 form a redundancy group and share received traffic with each other. Specifically, the first provider edge router 304-1 can send the multicast traffic received from the multicast source 302 to the second provider edge router 304-2 and the third provider edge router 304-3. More specifically, the first provider edge router 304-1 can send the multicast traffic to the second provider edge router 304-2 and third provider edge router 304-3 through network tunnels to distribute the multicast traffic across the redundancy group. As a result, the first multicast receiver 310-1 can access, e.g. join a multicast flow, through any of the provider edge routers 304-1, 304-2, and 304-3 to access the multicast traffic and establish one or more multicast flows with the multicast source 302. However, as discussed previously, the process of distributing the multicast data from the first provider edge router 304-1 to the second provider edge router 304-2 and third provider edge router 304-3 can consume large amounts of computational resources.

In order to reduce used computational resources, the first provider edge router 304-1 can be configured to refrain from transferring the multicast traffic received from the multicast source 302 to the second provider edge router 304-2 and the third provider edge router 304-3. Specifically, the first provider edge router 304-1 can be configured to refrain from transferring the multicast traffic to the second provider edge router 304-2 and the third provider edge router 304-3, while the routers 304-1, 304-2, and 304-3 serve as all-active multi-homing segments, in order to reduce computational resource usage. This can reduce burdens of synching multicast traffic across routers in redundancy groups in all-active multi-homing EVPN deployments.

Specifically, instead of transmitting the multicast traffic to the second provider edge router 304-2 and the third provider edge router 304-3, the first provider edge router 304-1 can originate a multicast routing message in response to receiving the multicast traffic from the multicast source 302. The multicast routing message can include a loopback address of the first provider edge router 304-1. The loopback address of the first provider edge router 304-1 can be uniquely associated with the first provider edge router 304-1 and used to uniquely identify the first provider edge router 304-1 amongst a plurality of provider edge routers. For example, the first provider edge router 304-1 can have a loopback address of 10.1.1.1 while the second provider edge router 304-2 can have a loopback address of 20.1.1.1. The multicast routing message can include a TLV of the loopback address of the first provider edge router 304-1. Additionally, the multicast routing message originated by the first provider edge router 304-1 can include a multicast source indicator of the multicast source 302 and a multicast group identifier associated with the multicast traffic, e.g. a multicast flow identifier of the multicast traffic received from the multicast source 302.

After generating the multicast message, the first provider edge router 304-1 can flood the multicast message while refraining from transferring the multicast traffic to the other all-active multi-homing segments, e.g. the second provider edge router 304-2 and the third provider edge router 304-3. Specifically, the first provider edge router 304-1 can flood the multicast message by sending the multicast message to one or a combination of the multicast core network 306, the first last hop router 308-1, the second last hop router 308-2, the third last hop router 308-3, the first multicast receiver 310-1, the second multicast receiver 310-2, and the third multicast receiver 310-3. The first provider edge router 304-1 can use an applicable message flooding scheme for flooding the multicast message to applicable devices/network devices. Specifically, the first provider edge router 304-1 can use a PFM-SD mechanism to flood the multicast routing message as a PFM-SD message.

In turn, the devices that receive the multicast message with the loopback address of the first provider edge router 304-1 can use the loopback address to direct traffic back to the first provider edge router 304-1, thereby forming one or more multicast flows for the multicast traffic. Specifically, the devices can create an entry, e.g. in a routing table, that includes a multicast source indicator of the multicast source 302, a multicast group identifier associated with the multicast traffic, and the loopback address of the first provider edge router 304-1. In turn, the devices can use the entry to direct traffic for the specific multicast traffic flow back to the first provider edge router 304-1. For example, the last hop router 308-1 can use the entry, including the loopback address of the first provider edge router 304-1, to send a join, e.g. protocol-independent multicast (PIM) join, back to the first provider edge router 304-1 for forming the multicast flow. This can ensure that traffic, e.g. a PIM join, lands on the first provider edge router 304-1 for the multicast traffic without distributing the multicast traffic to the other provider edge routers lacking the multicast traffic. As follows, this can eliminate the need to distribute received multicast traffic to all provider edge routers in a redundancy group, thereby conserving computational resources.

In various embodiments, the multicast flow can switch to a different provider edge router, e.g. the multicast source 302 can rehash the multicast flow to the different provider edge router. Specifically, the multicast source 302 can redirect the multicast traffic from the first provider edge router 304-1 to the second provider edge router 304-2. Subsequently, the second provider edge router 304-2 can repeat the above-discussed process with respect to the first provider edge router 304-1. Specifically, in response to receiving the multicast traffic from the multicast source 302, the second provider edge router 304-2 can generate a multicast routing message. The multicast routing message can include the multicast source indicator of the multicast traffic, the multicast group identifier associated with the multicast traffic, and a loopback address, e.g. 20.1.1.1 of the second provider edge router 304-2. The second provider edge router 304-2 can then flood the multicast messaging message, e.g. into the multicast core network 306. Subsequently, devices, e.g. the second last hop router 308-2 can direct traffic, e.g. a PIM join, to the second provider edge router 304-2 using the loopback address of the second provider edge router 304-2 included in the multicast routing message sent from the second provider edge router 304-2. Similar to the techniques described with respect to the first provider edge router 304-1, including the loopback address of the second provider edge router 304-2 in the multicast routing message can eliminate the need to replicate the multicast traffic across the redundancy group. Specifically, the second provider edge router 304-2 does not need to replicate the multicast traffic across the first provider edge router 304-1 and the third provider edge router 304-3.

The provider edge routers 304-1, 304-2, and 304-3 can bridge traffic between each other when the multicast source 302 rehashes the multicast flow between different provider edge routers. For example, the multicast source 302 can redirect the multicast flow from the first provider edge router 304-1 to the second provider edge router 304-2. Further in the example, the first provider edge router 304-1 can continue to receive traffic for the multicast flow as the second provider edge router 304-2 sets up the multicast flow, e.g. generates and floods a multicast routing message. Subsequently, the first provider edge router 304-1 can send received traffic of the multicast flow to the second provider edge router 304-2, e.g. as the second provider edge router 304-2 establishes the multicast flow. This can reduce the potential for traffic loss in the multicast flow as the multicast routing message is flooded from the second provider edge router 304-2 and reverse path forwarding (RPF) for the multicast flow is established to the second provider edge router 304-2.

In various embodiments, the multicast source 302 can be concurrently connected to different provider edge routers through different multicast flows. Specifically, the multicast source 302 can send multicast traffic for a first multicast group/flow to the first provider edge router 304-1 while also sending multicast traffic for a second multicast group/flow to the second provider edge router 304-2. The first provider edge router 304-1 can send a multicast routing message for the first multicast group while the second provider edge router 304-2 can send a multicast routing message for the second multicast group. Specifically, the first provider edge router 304-1 can flood a multicast message including a multicast group identifier of the first multicast group and a loopback address of the first provider edge router 304-1 to establish and maintain a multicast flow for the first multicast group. Further, the second provider edge router 304-2 can flood a multicast message including a multicast group identifier of the second multicast group and a loopback address of the second provider edge router 304-2 to establish and maintain a multicast flow for the second multicast group.

Additionally, in various embodiments, the multicast source 302 can distribute the multicast traffic to multiple provider edge routers in the same redundancy group. Specifically, the multicast source 302 can hash the multicast traffic based on different UDP ports, thereby sending the multicast traffic to different provider edge routers. For example, the multicast source 302 can send the multicast traffic to both the first provider edge router 304-1 and the second provider edge router 304-2. This can create issues associated with flooding of multiple multicast routing messages from different provider edge routers for the same multicast traffic. Specifically, this can create a transient RPF flap.

To counteract this issue, the provider edge routers can be configured to withdraw from acting as a source active router for specific multicast traffic and refrain from sending out multicast routing messages for the specific multicast traffic. Specifically, the first and second provider edge routers 304-1 and 304-2 can compare their originating IP addresses/loopback addresses to determine which of the first and second provider edge routers 304-1 and 304-2 should stop acting as s source active router for the specific multicast traffic. For example, if the second provider edge router 304-2 has a higher originating IP address than the first provider edge router 304-1, then the second provider edge router 304-2 can act as a source active router for the traffic, while the first provider edge router 304-1 stops acting as a source active router for the traffic. In turn, the first provider edge router 304-1 can refrain from flooding multicast routing messages for the specific traffic that include the loopback address of the first provider edge router 304-1.

FIG. 4 illustrates an example multicast environment 400 with layer 2 stretching. The example environment 400 shown in FIG. 4 includes a multicast source 402, a first provider edge router 404-1, a second provider edge router 404-2, a third provider edge router 404-3, a fourth provider edge router 404-4, a fifth provider edge router 404-5, a IP/Multiprotocol Layer Switching (MPLS) core 406, and a multicast receiver 408. The environment 400 shown in FIG. 4 can be implemented using one or a combination of the environments and architectures shown in FIGS. 1-2. For example, the multicast environment 400 can be implemented, at least in part, through one or more data centers formed by the environment 200 shown in FIG. 2A. Further, the multicast environment 400 can be implemented as part of an EVPN network deployment. While the environment 400 is shown to include a specific number of devices, in various embodiments, the environment 400 can be formed by a different number of devices, e.g. provider edge routers.

In the example environment 400 shown in FIG. 4, the first provider edge router 404-1 is coupled to the multicast source 402. Further, in the example environment 400 shown in FIG. 4, the first provider edge router 404-1 is coupled to the third provider edge router 404-3 through layer 2 stretching, e.g. through an EVPN layer 2 stretch connection. As a result, the first provider edge router 404-1 and the third provider edge router 404-3 can have the same IRB IP address.

As discussed previously, the fact that the first provider edge router 404-1 and the third provider edge router 404-3 have the same IRB IP address can be problematic in forming multicast flows. Specifically, the first provider edge router 404-1 can receive multicast traffic from the multicast source 402. However, since the first provider edge router 404-1 and the third provider edge router 404-3 have the same IRB IP address, the multicast receiver 408 can mistakenly assume that the third provider edge router 404-3 received the traffic from the multicast source 402. Accordingly, the multicast receiver 408 can attempt to communicate with the third provider edge router 404-3 instead of the first provider edge router 404-1 to establish the multicast flow for the multicast traffic. Similar to the techniques described with respect to the all-active multi-homing environment 300 shown in FIG. 3, the first provider edge router 404-1 can negate this problem by sending the multicast traffic received from the multicast source 402 to all devices connected through layer 2 stretch connections, e.g. the third provider edge router 404-3. However, this process of distributing the multicast traffic to other devices wastes computational resources, in particular as the number of devices connected through layer 2 stretch connections increases.

Similar to the techniques described with respect to the all-active multi-homing environment 300 shown in FIG. 3, the first provider edge router 404-1 can eliminate the need to send received multicast traffic to devices connected to the router 404-1 through layer 2 stretch connections. Specifically, the first provider edge router 404-1 can generate a multicast routing message in response to receiving the multicast traffic from the multicast source 402. The multicast routing message can include a multicast source indicator of the multicast source 402, a multicast group identifier of the multicast traffic, and a loopback address of the first provider edge router 404-1. As follows, the first provider edge router 404-1 can flood the multicast routing message, e.g. to the IP/MPLS core 406, while refraining from sending the multicast traffic to the third provider edge router 404-3. Specifically, the first provider edge router 404-1 can use a PFM-SD mechanism to flood the multicast routing message as a PFM-SD message. This can reduce computational resources used to replicate multicast traffic across routers connected through layer 2 stretch connection.

The multicast routing message flooded from the first provider edge router 404-1 can then be used to establish and maintain one or more multicast flows for the multicast traffic received from the multicast source 402. Specifically, the multicast receiver 408 use the multicast routing message to send a PIM join to the first provider edge router 404-1 and not the third provider edge router 404-3. More specifically, the multicast receiver 408 can use the loopback address of the first provider edge router 404-1 included as part of the multicast routing message to send the PIM join back to the first provider edge router 404-1 for establishing the multicast flow. This can ensure that traffic lands on the first provider edge router 404-1 for the multicast traffic without distributing the multicast traffic to the other provider edge routers, e.g. those connected through layer 2 stretch connections.

In various embodiments, the provider edge routers described herein can periodically flood multicast routing messages, e.g. into multicast core networks. For example, the provider edge routers can be configured to transmit multicast routing messages every day. Further in the example, the provider edge routers can be configured to periodically transmit the multicast routing messages as long as the provider edge routers continue to receive multicast traffic from one or more multicast sources.

Further, in various embodiments, the provider edge routers described herein can generate and send clear flag multicast routing messages. Specifically, a provider edge router can determine whether it is receiving multicast traffic from a multicast source. Subsequently, if the provider edge router determines that it is no longer receiving multicast traffic from a multicast source, then the provider edge router can generate and flood a clear flag multicast routing message. A clear flag multicast routing message can indicate that multicast traffic for a specific multicast group is no longer passing through a provider edge router. Specifically, a clear flag multicast routing message can include a source active clear flag for a specific multicast group and a loopback address to indicate that a provider edge router associated with the loopback address is no longer an active source for the multicast group. In turn, devices can clear routing tables, e.g. remove entries associating a loopback address/provider edge router with a specific multicast group and multicast source, based on a clear flag multicast routing message. This can be a fast and efficient way of disassociating a provider edge router from a multicast group and source, thereby helping to ensure that multicast traffic lands on a correct provider edge router.

FIG. 5 illustrates a flowchart for an example method for controlling multicast traffic flows through provider edge routers using loopback addresses of the provider edge routers. The method shown in FIG. 5 is provided by way of example, as there are a variety of ways to carry out the method. Additionally, while the example method is illustrated with a particular order of steps, those of ordinary skill in the art will appreciate that FIG. 5 and the modules shown therein can be executed in any order and can include fewer or more modules than illustrated.

Each module shown in FIG. 5 represents one or more steps, processes, methods or routines in the method.

At step 500, multicast traffic is received at a first provider edge router from a multicast source. The first provider edge router can be part of a group of provider edge routers in a network deployment. Specifically, the first provider edge router can be included as part of a redundancy group of provider edge routers forming all-active multi-homing segments in an EVPN network deployment. Alternatively, the first provider edge router can be included as part of a plurality of provider edge routers coupled together, at least in part, through layer 2 stretching in EVPN network deployments.

At step 502, a multicast routing message is originated at the first provider edge router. The multicast routing message can include a loopback address of the first provider edge router. Additionally, the multicast routing message can include a multicast source identifier of the multicast source and a multicast group identifier of the one or more multicast flows associated with the multicast traffic received at the first provider edge router from the multicast source.

At step 504, the multicast routing message is flooded from the first provider edge router into a multicast core network. Specifically, the multicast routing message can be flooded into the multicast core network for controlling traffic in the one or more multicast flows to the first provider edge router. For example, the multicast routing message can be used to create entries in routing tables that include the loopback address of the first provider edge router, the multicast source identifier of the multicast source and the multicast group identifier associated with the multicast traffic. Subsequently, the entries can be used to direct traffic towards the first provider edge router in the one or more multicast flows associated with the multicast traffic.

At step 506, one or more multicast joins are received at the first provider edge router from the multicast core network. Specifically, the one or more multicast joins can be received at the first provider edge router using the multicast routing message and the loopback address included in the multicast routing message. In turn, the one or more multicast joins can be used to establish and maintain the one or more multicast traffic flows to the first provider edge router and associated with the multicast traffic. The joins can be received at the first provider edge router in response to the multicast routing message without sending the multicast traffic from the first provider edge router to other provider edge routers in the plurality of provider edge routers.

The disclosure now turns to FIGS. 6 and 7, which illustrate example network devices and computing devices, such as switches, routers, load balancers, client devices, and so forth.

FIG. 6 illustrates a computing system architecture 600 wherein the components of the system are in electrical communication with each other using a connection 605, such as a bus. Exemplary system 600 includes a processing unit (CPU or processor) 610 and a system connection 605 that couples various system components including the system memory 615, such as read only memory (ROM) 620 and random access memory (RAM) 625, to the processor 610. The system 600 can include a cache 612 of high-speed memory connected directly with, in close proximity to, or integrated as part of the processor 610. The system 600 can copy data from the memory 615 and/or the storage device 630 to the cache 612 for quick access by the processor 610. In this way, the cache 612 can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware or software service, such as service 1 632, service 2 634, and service 3 636 stored in storage device 630, configured to control the processor 610 as well as a special-purpose processor where software instructions are incorporated into the actual processor design. The processor 610 may be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include services 632, 634, 636 for controlling the processor 610. Other hardware or software modules are contemplated. The storage device 630 can be connected to the system connection 605. In one aspect, a hardware module that performs a particular function can include the software component stored in a computer-readable medium in connection with the necessary hardware components, such as the processor 610, connection 605, output device 635, and so forth, to carry out the function.

FIG. 7 illustrates an example network device 700 suitable for performing switching, routing, load balancing, and other networking operations. Network device 700 includes a central processing unit (CPU) 704, interfaces 702, and a bus 710 (e.g., a PCI bus). When acting under the control of appropriate software or firmware, the CPU 704 is responsible for executing packet management, error detection, and/or routing functions. The CPU 704 preferably accomplishes all these functions under the control of software including an operating system and any appropriate applications software. CPU 704 may include one or more processors 708, such as a processor from the INTEL X86 family of microprocessors. In some cases, processor 708 can be specially designed hardware for controlling the operations of network device 700. In some cases, a memory 706 (e.g., non-volatile RAM, ROM, etc.) also forms part of CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 704 to efficiently perform routing computations, network diagnostics, security functions, etc.

Although the system shown in FIG. 7 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC), which can be configured to perform routing and/or switching operations. The ASIC can communicate with other components in the network device 700 via the bus 710, to exchange data and signals and coordinate various types of operations by the network device 700, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   receiving, at a first provider edge router of a plurality of provider edge routers, multicast traffic of one or more multicast flows from a multicast source;
   refraining from transmitting the multicast traffic from the first provider edge router to at least one other edge router of the plurality of provider edge routers in response to receiving the multicast traffic from the multicast source;
   originating, at the first provider edge router in response to receiving the multicast traffic from the multicast source, a multicast routing message including a multicast source indicator of the multicast source, a multicast group identifier of the multicast traffic, and a loopback address of the first provider edge router;
   flooding the multicast routing message into a multicast core network, from the first provider edge router, for controlling traffic in the one or more multicast flows extending through at least a portion of the multicast core network to the first provider edge router; and
   receiving one or more multicast joins at the first provider edge router from the multicast core network for establishing the one or more multicast flows through the multicast core network to the first provider edge router based on the multicast routing message including the loopback address of the first provider edge router.

2. The method of claim 1, wherein the multicast routing message is a PIM flooding mechanism and source discovery (PFM-SD) message and the multicast routing message is flooded into the multicast core network.

3. The method of claim 1, wherein the loopback address of the first provider edge router is included in the multicast routing message as a type-length value (TLV).

4. The method of claim 1, wherein the first provider edge router and the at least one other edge router of the plurality of provider edge routers are connected to the multicast source through all active multihoming.

5. The method of claim 4, wherein the multicast routing message including the loopback address of the first provider edge router is flooded to the multicast core network while refraining from replicating the multicast traffic across the at least one of the plurality of provider edge routers.

6. The method of claim 1, wherein the first provider edge router periodically floods the multicast routing message into the multicast core network as the first provider edge router receives the multicast traffic from the multicast source.

7. The method of claim 1, further comprising:
receiving, at a second provider edge router of the plurality of provider edge routers, additional multicast traffic of the one or more multicast flows from the multicast source;
originating, at the second provider edge router, another multicast routing message including the multicast source indicator of the multicast source, the multicast group identifier of the additional multicast traffic, and a loopback address of the second provider edge router, wherein the loopback address of the second provider edge router is different than the loopback address of the first provider edge router;
flooding the another multicast routing message into the multicast core network for controlling the traffic in the one or more multicast flows through the multicast core network to the second provider edge router; and
receiving one or more additional multicast joins at the second provider edge router from the multicast core network for re-establishing the one or more multicast flows through the multicast core network to the second provider edge router based on the another multicast routing message including the loopback address of the second provider edge router.

8. The method of claim 1, wherein the multicast source is concurrently connected in multicast flows to both the first provider edge router and a second provider edge router of the plurality of provider edge routers for providing multicast traffic in different multicast groups including a first multicast group of the multicast traffic sent to the first provider edge router and a second multicast group of additional multicast traffic sent to the second provider edge router.

9. The method of claim 1, wherein at least one of the plurality of provider edge routers is connected to the multicast source through a layer 2 stretch connection.

10. The method of claim 9, wherein the at least one of the plurality of provider edge routers has the same integrated routing and bridging (IRB) IP address as the first provider edge router.

11. The method of claim 9, wherein the multicast routing message including the loopback address of the first provider edge router is flooded to the multicast core network while refraining from replicating the multicast traffic across the at least one of the plurality of provider edge routers through the layer 2 stretch connection.

12. The method of claim 1, further comprising:
identifying, by the first provider edge router, that the first provider edge router is no longer receiving the multicast traffic from the multicast source;
generating, by the first provider edge router, a clear flag multicast routing message to clear an association of the loopback address of the first provider edge router with the multicast source indicator of the multicast source and the multicast group identifier of the multicast traffic; and
flooding the clear flag multicast routing message into the multicast core network for controlling traffic in the one or more multicast flows through the multicast core network.

13. The method of claim 1, further comprising:
receiving, by two or more provider edge routers of the plurality of provider edge routers including the first provider edge router, the multicast traffic from the multicast source;
determining, by the two or more provider edge routers, whether to flood the multicast core network with multicast routing messages for the multicast traffic based on loopback addresses of the two or more provider edge routers; and
flooding the multicast routing message into the multicast core network from the first provider edge router, if it is determined to flood the multicast routing message for the multicast traffic into the multicast core network based on the loopback addresses of the two or more provider edge routers.

14. The method of claim 13, wherein the multicast traffic is received at the two or more provider edge routers from the multicast source based on different user datagram protocol ports.

15. A system comprising:
one or more processors; and
at least one computer-readable storage medium having stored therein instructions which, when executed by the one or more processors, cause the one or more processors to perform operations comprising:
receiving, at a first provider edge router of a plurality of provider edge routers, multicast traffic of one or more multicast flows from a multicast source;
refraining from transmitting the multicast traffic from the first provider edge router to at least one other edge router of the plurality of provider edge routers in response to receiving the multicast traffic from the multicast source;
originating, at the first provider edge router in response to receiving the multicast traffic from the multicast source, a multicast routing message including a multicast source indicator of the multicast source, a multicast group identifier of the multicast traffic, and a loopback address of the first provider edge router as a type-length value (TLV) included as part of the multicast routing message;
flooding the multicast routing message into a multicast core network, from the first provider edge router, for controlling traffic in the one or more multicast flows through the multicast core network to the first provider edge router; and
receiving one or more multicast joins at the first provider edge router from the multicast core network for establishing the one or more multicast flows through the multicast core network to the first provider edge router based on the multicast routing message including the loopback address of the first provider edge router.

16. The system of claim 15, wherein the first provider edge router and the at least one other edge router of the plurality of provider edge routers are connected to the multicast source through all active multihoming.

17. The system of claim 16, wherein the instructions which, when executed by the one or more processors, further cause the one or more processors to perform operations comprising:
- receiving, at a second provider edge router of the plurality of provider edge routers, additional multicast traffic of the one or more multicast flows from the multicast source;
- originating, at the second provider edge router, another multicast routing message including the multicast source indicator of the multicast source, the multicast group identifier of the additional multicast traffic, and a loopback address of the second provider edge router, wherein the loopback address of the second provider edge router is different than the loopback address of the first provider edge router;
- flooding the another multicast routing message into the multicast core network for controlling the traffic in the one or more multicast flows through the multicast core network to the second provider edge router; and
- receiving one or more additional multicast joins at the second provider edge router from the multicast core network for re-establishing the one or more multicast flows through the multicast core network to the second provider edge router based on the another multicast routing message including the loopback address of the second provider edge router.

18. The system of claim 15, wherein at least one of the plurality of provider edge routers is connected to the multicast source through a layer 2 stretch connection.

19. The system of claim 15, wherein the instructions which, when executed by the one or more processors, further cause the one or more processors to perform operations comprising:
- identifying, by the first provider edge router, that the first provider edge router is no longer receiving the multicast traffic from the multicast source;
- generating, by the first provider edge router, a clear flag multicast routing message to clear an association of the loopback address of the first provider edge router with the multicast source indicator of the multicast source and the multicast group identifier of the multicast traffic; and
- flooding the clear flag multicast routing message into the multicast core network for controlling traffic in the one or more multicast flows through the multicast core network.

20. A non-transitory computer-readable storage medium having stored therein instructions which, when executed by a processor, cause the processor to perform operations comprising:
- receiving, at a first provider edge router of a plurality of provider edge routers, multicast traffic of one or more multicast flows from a multicast source;
- refraining from transmitting the multicast traffic from the first provider edge router to at least one other edge router of the plurality of provider edge routers in response to receiving the multicast traffic from the multicast source;
- originating, at the first provider edge router, a multicast routing message including a multicast source indicator of the multicast source, a multicast group identifier of the multicast traffic, and a loopback address of the first provider edge router; and
- flooding the multicast routing message, through a PIM flooding mechanism and source discovery (PFM-SD) message, into a multicast core network, from the first provider edge router, for controlling traffic in the one or more multicast flows through the multicast core network to the first provider edge router.

* * * * *